US009335932B2

(12) United States Patent
Lango et al.

(10) Patent No.: US 9,335,932 B2
(45) Date of Patent: May 10, 2016

(54) STORAGE UNIT SELECTION FOR VIRTUALIZED STORAGE UNITS (71) Applicant: BRACKET COMPUTING, INC., Sunnyvale, CA (US)

(72) Inventors: Jason A. Lango, Mountain View, CA (US); John K. Edwards, Sunnyvale, CA (US)

(73) Assignee: Bracket Computing, Inc., Sunnyvale, CA (US)

( * ) Notice: Subject to any disclaimer, the term of this patent is extended or adjusted under 35 U.S.C. 154(b) by 336 days.

(21) Appl. No.: 13/837,375

(22) Filed: Mar. 15, 2013

(65) Prior Publication Data

US 2014/0281308 A1    Sep. 18, 2014

(51) Int. Cl.
  *G06F 12/00*    (2006.01)
  *G06F 3/06*    (2006.01)
  *G06F 12/10*    (2016.01)
  *G06F 9/455*    (2006.01)

(52) U.S. Cl.
  CPC .............. *G06F 3/061* (2013.01); *G06F 3/0605* (2013.01); *G06F 3/0634* (2013.01); *G06F 3/0653* (2013.01); *G06F 3/0683* (2013.01); *G06F 3/0685* (2013.01); *G06F 3/0614* (2013.01); *G06F 3/0628* (2013.01); *G06F 9/45533* (2013.01); *G06F 12/1036* (2013.01)

(58) Field of Classification Search
  CPC . G06F 3/0614; G06F 3/0628; G06F 12/1036; G06F 9/45533
  USPC .............. 711/162, 170, 203; 710/10, 31, 120, 710/310; 707/640, 644, 646
  See application file for complete search history.

(56) References Cited

U.S. PATENT DOCUMENTS

| 7,647,329 | B1 * | 1/2010 | Fischman et al. .......... 707/999.1 |
| 8,443,153 | B1 | 5/2013 | Edwards |
| 2001/0011326 | A1 * | 8/2001 | Yoshikawa et al. ........... 711/119 |
| 2006/0015678 | A1 * | 1/2006 | Wang et al. .................... 711/104 |
| 2008/0120350 | A1 * | 5/2008 | Grabowski et al. ........... 707/202 |
| 2009/0228669 | A1 * | 9/2009 | Slesarev et al. ............... 711/161 |

(Continued)

OTHER PUBLICATIONS

European Patent Office, "Search Report" in application No. PCT/US2014/023814, dated Jun. 26, 2014, 13 pages.

(Continued)

*Primary Examiner* — Reba I Elmore
(74) *Attorney, Agent, or Firm* — Hickman Palermo Becker Bingham LLP (57) ABSTRACT

Performance information for storage units located at a virtual data center is determined by executing storage administrator logic whose execution is controlled by a management entity different than the virtual data center provider. Performance expectations are automatically determined based on the determined performance information. In response to determining that a particular storage unit is incompatible with performance expectations applicable to the particular storage unit, embodiments cause a reduction in utilization of the particular storage unit. Based on determined performance information, another embodiment determines that a performance pattern indicating a physical co-location of a first storage unit and a second storage unit has occurred. In response to determining that the performance pattern indicating a physical co-location of a first storage unit and a second storage unit has occurred, the embodiment disables use of a selected storage unit of the first storage unit or the second storage unit for at least a particular purpose.

27 Claims, 5 Drawing Sheets

(56) References Cited

U.S. PATENT DOCUMENTS

| | | |
|---|---|---|
| 2010/0332401 A1 | 12/2010 | Prahlad et al. |
| 2012/0032965 A1* | 2/2012 | Patel et al. .................... 345/503 |
| 2012/0042115 A1* | 2/2012 | Young ............................... 711/6 |
| 2013/0054932 A1* | 2/2013 | Acharya et al. ............... 711/202 |
| 2013/0060839 A1* | 3/2013 | Van Biljon ............. G06Q 30/04 709/203 |
| 2013/0238791 A1* | 9/2013 | Anderson ........... G06F 11/3006 709/224 |
| 2014/0122818 A1* | 5/2014 | Hayasaka ......... G06F 17/30156 711/162 |
| 2014/0281350 A1 | 9/2014 | Lango |

OTHER PUBLICATIONS

European Patent Office, "Search Report" in application No. PCT/2014/025046, dated Jul. 7, 2014, 9 pages.

Current Claims in European Application No. PCT/US2014/025046, dated Jul. 2014, 19 pages.

Current Claims in application No. PCT/US2014/023814, dated Jun. 2014, 7 pages.

* cited by examiner

STORAGE UNIT SELECTION FOR VIRTUALIZED STORAGE UNITS

TECHNICAL FIELD

The present disclosure generally relates to computer-implemented techniques for selecting virtualized storage units for utilization.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Many enterprises and their computer systems utilize storage units that are provided by a virtual data center (VDC) and are accessible through the internet. In this arrangement, the enterprise is a client of the virtual data center (VDC). Storage units provided by the virtual data center may be virtualized storage pools, comprised of partitioned portions of multiple different physical storage devices at the virtual data center. Such clients also may instantiate CPU resources to perform work in a VDC in cooperation with the storage units. In such an arrangement, the utilization of storage may be managed independently of CPU resources.

Such cloud storage services may provide a client with many benefits, such as reduced storage costs, easier scalability, and a reduced administrative burden. However, a drawback of such cloud storage systems is that the performance of storage units provided by the virtual data center often varies greatly; there may be significant variation in the time needed to complete a read operation or a write operation. Furthermore, enterprise clients often pay similar amounts for different storage units that perform in a drastically different manner. Approaches for obtaining higher quality performance from cloud storage units are needed.

SUMMARY OF THE INVENTION

The appended claims may serve as a summary of the invention.

DESCRIPTION OF EXAMPLE EMBODIMENTS

Methods for storage unit selection are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Implementation Mechanisms—Hardware Overview
4.0 Extensions and Alternatives
1.0 General Overview Embodiments may be used in a networked computer system having a storage administrator computer, a plurality of computer-based storage units, and a client computer or machine. In an embodiment, a storage administrator manages a plurality of storage units associated with a client machine and automatically determines particular storage units whose utilization is to be reduced or particular storage units or whose utilization is to be disabled for at least a particular purpose. The determination may occur automatically based on observed performance of one or more storage units. The storage administrator may automatically cause the utilization of the particular storage unit to reduce or increase, or may automatically disable utilization of the particular storage unit for a particular purpose, based on the determined performance information.

According to an embodiment, a computer-implemented process determines performance information for each storage unit of a plurality of storage units located at a virtual data center. In this context, a virtual data center or VDC refers to any of one or more virtualized enterprise computer systems, virtual machine infrastructure in a private data center, computing, storage or networking resources in a private cloud, resources in a public cloud such as that offered by a cloud service provider (CSP), and hybrid cloud computing environments. The determining is performed by executing storage administrator logic whose execution is controlled by a management entity different than the virtual data center provider. The process determines automatically, based on the determined performance information, performance expectations. The process determines particular performance expectations applicable to a particular storage unit. The process determines that performance of the particular storage unit is incompatible with the particular performance expectations. The process causes, at least partially in response to determining that performance of the storage unit is incompatible with the performance expectations, a reduction in utilization of the particular storage unit. In some embodiments, utilization may be increased or changed in other ways.

Such an approach may be particularly useful in an environment where the storage units associated with a client machine vary greatly in performance quality. In an embodiment where the storage units are virtual disks provided by virtual data centers, the quality of a particular virtual disks may vary depending on a variety of factors such as the quality of the particular physical machine that hosts the virtual disk, the amount of workload handled by the particular physical machine that hosts the virtual disk, or the quality of the particular network path used to access the virtual disk. By identifying problem storage units and automatically rearranging the storage of data to reduce utilization of the particular storage unit, the storage administrator logic may improve the overall storage unit performance provided to a client machine.

According to another embodiment, a computer-implemented process determines performance information for each storage unit of a plurality of storage units located at a virtual data center. The determining is performed by executing storage administrator logic whose execution is controlled by a management entity different than the virtual data center provider. Based on the determined performance information, the process determines that a performance pattern indicating a physical co-location of a first storage unit and a second storage unit has occurred. In response to determining that the performance pattern has occurred, the process disables use of one or both of the first storage unit and the second storage unit for at least a particular purpose. Such an approach may be particularly useful in systems where it is critical that at least one storage unit of the first storage unit and the second storage unit is operable at all times. The approach may (1) help reduce the chances of both storage units failing at the same time and (2) improve the price to performance ratio of the system as a whole by optimizing the use of underlying physical infrastructure so that more hard disk spindles are utilized.

2.0 Structural and Functional Overview

Figure 1:
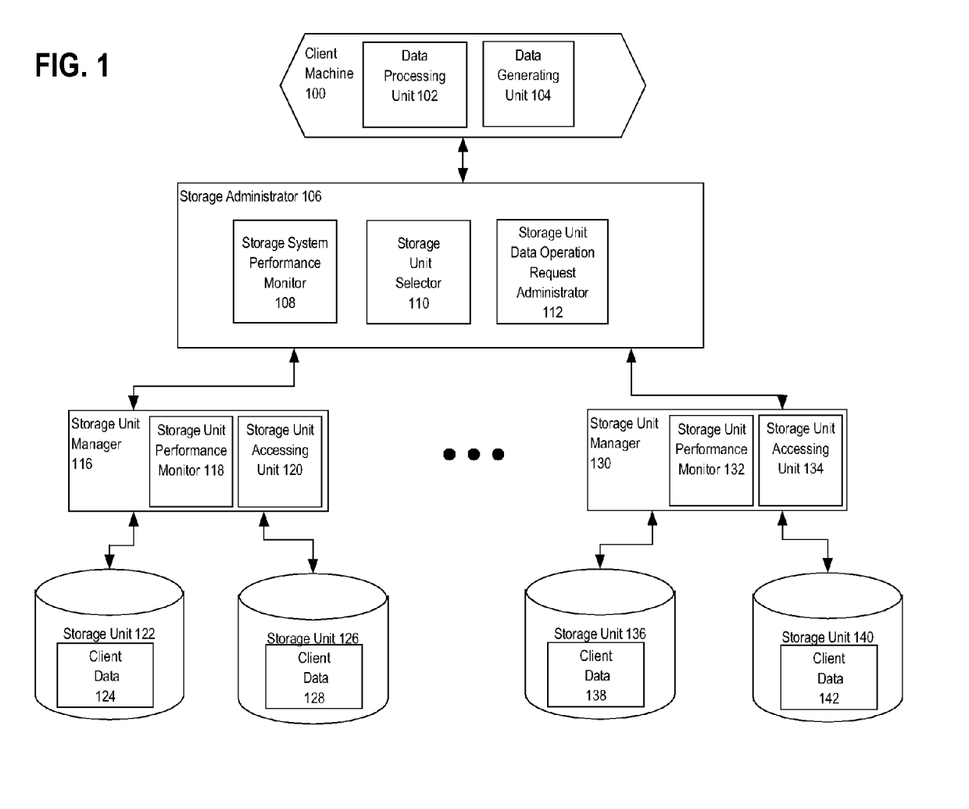
FIG. 1 illustrates an example networked computer system arrangement that may be used to implement an embodiment.

FIG. 1 illustrates an example networked computer system arrangement that may be used to implement an embodiment. For purposes of illustrating clear examples, FIG. 1 shows a representative number of various functional elements that may be used in an embodiment; however, other embodiments may use any number of such functional elements and therefore FIG. 1 is intended as merely one possible implementation example. Client machine 100 comprises data processing unit 102, which may process data retrieved from storage units remote to the client machine, and data generating unit 104, which may generate data that is stored storage units remote to the client machine.

Client machine 100 may be communicatively coupled to storage administrator 106. Client machine 100 may send data to, or receive data from, storage administrator 106 using any of a variety of communication protocols including, but not limited, to the Internet Small Computer System Interface (iSCSI) protocol. Client machine 100 may be hosted in a variety of locations including, but not limited to, a virtual or physical machine in an enterprise data center or a virtual machine hosted in a third-party virtual data center. Storage administrator 106 represents a computer, programs or processes, or other logical elements for handling data operation requests directed to storage units remote from client machine 100, such as storage units 122, 126, 136, 140. Storage units 122, 126, 136, 140 may be virtualized storage units hosted by one or more virtual data center providers.

The data operation requests may include requests to read data from, or write data to, the storage units. Storage administrator 106 may be remote from client machine 100 and the client machine may communicate with the storage administrator through one or more networks of different types, such as one or more local area networks, wide area networks, internetworks, or internets.

Storage administrator 106 comprises storage unit data operation request administrator 112, storage system performance monitor 108, and storage unit selector 110. Storage unit data operation request administrator 112 may direct incoming data operations requests to the appropriate storage unit managers or storage units. Storage system performance monitor 108 may receive information about the performance of various storage units, including storage units associated with client machine 100, such as storage units 122, 126, 136, 140. Storage unit selector 110 may analyze information collected by storage system performance monitor 108 and may determine that utilization of certain storage units is to decrease, increase, or that certain storage units are to be utilized for a different purpose. Storage unit selector 110 may cause the change in utilization of the certain storage units.

Storage administrator 106 may be communicatively coupled to one or more storage unit managers, such as storage unit managers 116, 130. Each of the storage unit managers 116, 130 may be communicatively coupled to one or more storage units, such as storage units 122, 126, 136, 140. In an embodiment, storage administrator 106 communicates directly with storage units 122, 126, 136, 140, rather than communicating through a storage unit manager.

Storage unit managers 116 and 130 comprise storage unit performance monitors 118 and 132 and storage unit accessing units 120 and 134. Storage unit accessing unit 120 may send information to, or receive information from, storage units 122 and storage unit 126, which are both communicatively coupled to storage unit manager 116. Similarly, storage unit accessing unit 134 may send information to or receive information from storage units 136 and storage unit 140, which are both communicatively coupled to storage unit manager 130. Storage unit performance monitors 118 and 132 may collect performance information about the storage units associated with their respective storage unit managers, and may also send the performance information, or other information determined based on the performance information, to storage administrator 106.

Storage units 122, 126, 136, 140 may include data associated with client machine 100, such as client data 124, 128, 138, 142. Client machine 100 may read data from, or write data to, storage units 122, 126, 136, 140 by sending the read or write request to storage administrator 106.

Storage administrator 106 may receive requests to read and/or write data from a plurality of different clients, such as client machine 100, and may be communicatively coupled with a plurality of different storage units, either directly or indirectly through a storage unit managers, where some storage units contain data associated with a particular client and other storage units contain data associated with a different client.

Communications between storage administrator 106, storage unit managers 116, 130, and/or storage units 122, 126, 136, 140 may occur through any of a variety of networks, such as one or more local area networks, wide area networks, internetworks, or internets.

Figure 2:
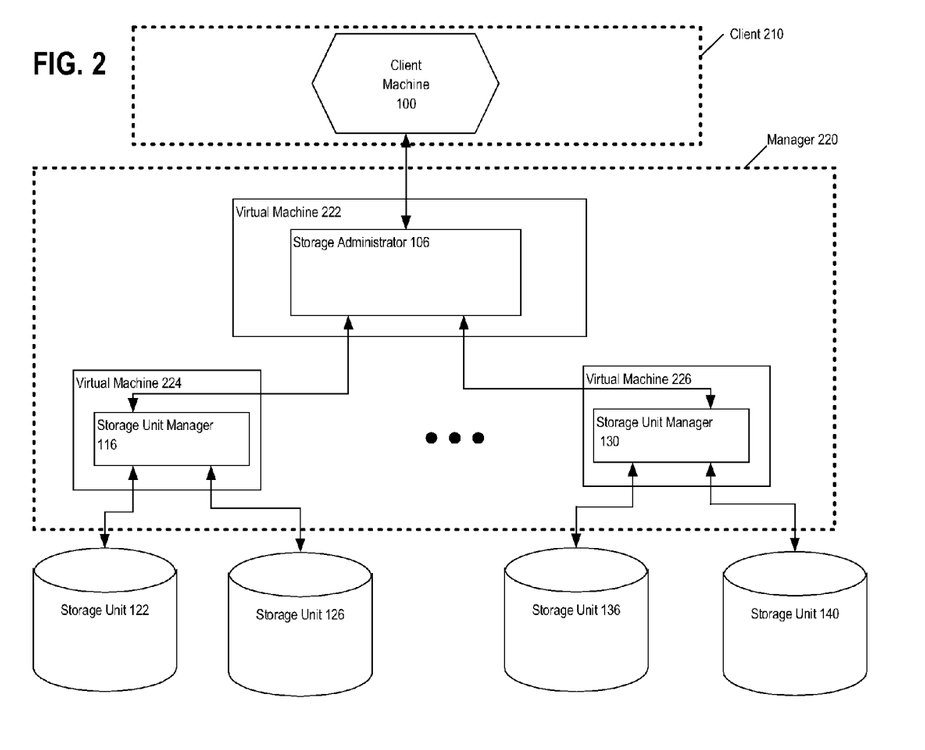
FIG. 2 illustrates a context of the example networked computer system arrangement according to an embodiment.

FIG. 2 illustrates an example context of the example networked computer system arrangement of FIG. 1, according to an embodiment. Client machine 100 may be controlled by client 210 and the logic of storage administrator 106 and storage unit managers 116 and 130 may be controlled by manager 220.

Manager 220 may be different from the virtual data center provider that hosts storage units 122, 126, 136, 140 and different from client 210, which utilizes data stored in storage units 122, 126, 136, 140. Manager 220 may control and manage storage units 122, 126, 136, 140 on behalf of client 210, according to the methods described herein.

Storage administrator 106 may operate within virtual machine 222, storage unit manager 116 may operate within a separate virtual machine 224, and storage unit manager 130 may operate within a separate virtual machine 226. In an embodiment, virtual machine 222, 224, and 226 are hosted by the same virtual data center provider that hosts one or more of storage units 122, 126, 136, 140. Manager 220 may control the execution of processes within virtual machines 222, 224, 226, such as the logic of storage administrator 106, storage unit manager 116, and storage unit manager 130.

In some embodiments, client machine 100, which is controlled by client 210, may be hosted by the same virtual data center provider that hosts any of virtual machines 222, 224, and/or 226. However, in some embodiments, client machine 100 controlled by client 210 may be in a private data center hosted by client 210. In some embodiments, client machine 200 may itself be a virtual machine.

In some embodiments, storage administrator 106 accesses storage units 122, 126, 136, 140 directly, without requesting storage unit manager 116 or 130 to access storage units 122, 126, 136, 140. However, in some embodiments, one or more virtual data centers, which host storage units 122, 126, 136, 140, restrict the number of storage units that may be connected to a single virtual machine to be less than a particular number. In such an embodiment, a system as illustrated in FIG. 1, FIG. 2 may allow a storage administrator 106 to maximize the number of storage units that can be controlled by the storage administrator. Storage administrator 106 may manage storage units 122, 126, 136, 140 by requesting modules of a plurality of different virtual machines, such as storage unit managers 116 and 130 at virtual machines 224 and 226, to perform various data operations or provide necessary performance information. Such an approach may allow storage administrator 106 to manage a number of storage units that is greater than the maximum number of storage units permitted for access by a single virtual machine.

In some embodiments, storage units 122, 126, 136, 140 are at a plurality of different virtual data centers. For example, storage units 122 and 126 may be at a first virtual data center and storage units 136 and 140 may be at a different virtual data center. Thus, manager 220 may manage and control storage units hosted by a plurality of different virtual data centers on behalf of client 210.

Figure 3:
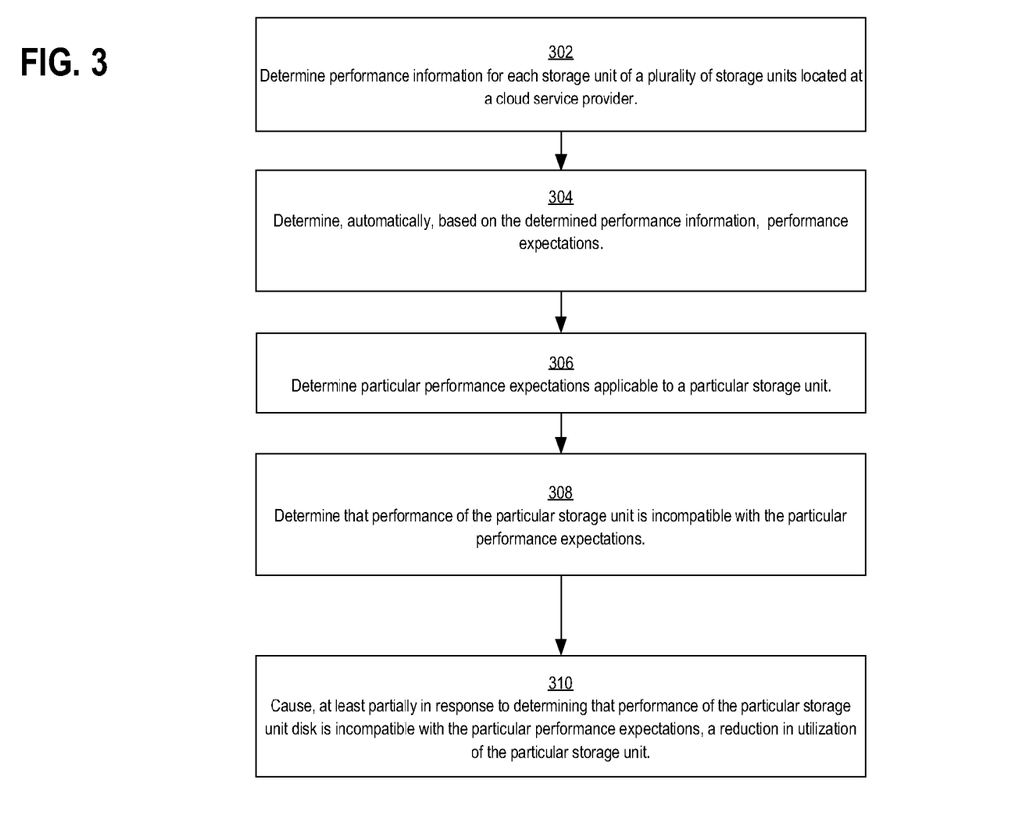
FIG. 3 illustrates an example method for automatically selecting a storage unit for reduced utilization.

FIG. 3 illustrates an example method for automatically selecting a storage unit for reduced utilization. The method of FIG. 3 may be implemented using one or more computer programs, other software elements, or other functional logic at storage administrator 106.

At block 302, storage administrator 106 determines performance information for each storage unit of a plurality of storage units located at a virtual data center. The determining and other portions of the process of FIG. 3 may be performed by executing storage administrator logic whose execution is controlled by a management entity different than the virtual data center provider.

The performance information for a particular storage unit may indicate a speed with which the storage unit completes data operation requests. The performance information may indicate, for example, total access times for storing information in, or retrieving information from, a particular storage unit. The performance information may also include more specific information, such as the speed at which read requests are completed, the speed at which write requests are completed, or even more specifically, the speed at which random read operations are completed, or the speed at which random write operations are completed. The performance information may summarize the performance of a particular set of storage units or may provide separate performance information for each storage unit. The particular set of storage units may be the entire set of storage units managed by storage administrator 106, or the entire set of storage units associated with client 210, or may be defined differently.

Performance information about a particular storage unit may be directly observed by storage administrator 106. For example, storage administrator 106 may calculate the amount of time elapsed between the sending of a data operation request to a storage unit or a storage unit manager and the completion of the data operation request.

In another embodiment, storage administrator 106 may determine performance information for storage units by collecting information from the storage unit manager that communicates with the storage unit. For example, storage unit manager 116 may determine the time elapsed between the time a data operation request is sent by storage unit manager 116 and the time a response to the data operation request is received by storage unit manager 116. Storage unit manager 116 and may communicate performance information, separately or in aggregate, to storage administrator 106.

In another embodiment, storage administrator 106 may determine performance information for storage units by collecting information from the one or more virtual data center(s) hosting that storage unit.

The performance information may summarize performance characteristics of various data operations requests observed over time. For example, the performance information may indicate a maximum, minimum, or median value of a performance characteristic within a particular period of time. For example, storage administrator 106 may determine that storage unit 122 completed data operation requests at an average rate of 20 operations per second for a particular period of time. In other embodiments, the performance information may identify the performance of individual data operation requests. For example, storage administrator 106 may determine that a particular request took greater than 1 second to complete.

At block 304, storage administrator 106 automatically determines, based on the determined performance information, performance expectations. The performance expectation may indicate performance expectations for one or more particular performance characteristics. The performance expectation may be indicated as a minimum or maximum value for the performance characteristic or a range of values. For example, a particular performance expectation may indicate that a median access time for data operation requests within any given ten minute period must be greater than 10 milliseconds per operation for each storage units.

In some embodiments, a performance expectation is applicable to all storage units that contain data associated with a particular client. In other embodiments, performance expectations are applicable to different class of storage units. For example, storage administrator 106 may determine a particular performance expectation that is applicable to storage units whose cost is within a particular range and may determine a different performance expectation that is applicable to storage units whose cost is within a different range.

In other embodiments, performance expectation may be applicable to storage unit classes, where the classes are determined based on characteristics other than cost. Such characteristics may include, but are not limited to, the performance quality advertised by a storage unit provider for the storage unit or the type of physical hardware associated with the storage units. For example, a particular performance expectation may be determined based on storage units that are advertised as "high-performing" storage units and the performance expectation may apply only to storage units advertised as "high-performing."

In some embodiments, storage administrator 106 monitors performance of each storage unit managed by storage administrator 106 to determine if the performance of the storage unit is compatible with the performance expectation applicable to the storage unit. At block 306, storage administrator 106 determines particular performance expectations applicable to a particular storage unit. In embodiments where different performance expectations are defined for different classes of storage units, determining particular performance expectations applicable to a particular storage unit may comprise determining particular characteristics of the particular storage unit to determine which performance expectations are applicable. For example, storage administrator 106 may determine that a particular performance expectation, which is applicable to storage units whose cost is within a particular cost range, is applicable to the particular storage unit based on a determination that the cost of the particular storage unit is within the particular cost range.

At block 308, storage administrator 106 determines that performance of the particular storage unit is incompatible with the performance expectation. The performance expectation may indicate a condition that must be true for the performance expectation to be satisfied. For example, a particular performance expectation may indicate a median performance speed for completing a data operation, and that performance of a particular storage unit is compatible with the performance expectation if the median speed of the particular storage unit performing a data operation over a particular period of time is faster than one standard deviation slower than the median performance speed.

At block 310, storage administrator 106 causes, at least partially in response to determining that performance of the storage unit disk is incompatible with the one or more performance expectations, a reduction in utilization of the particular storage unit. In some embodiments, causing a reduction in utilization of the particular storage unit comprises disabling utilization of the particular storage unit entirely. Storage administrator 106 may cause the reduction by notifying the particular storage unit manager, which manages the particular storage unit that the utilization is to be reduced. Storage administrator 106 may request, or instruct the particular storage unit manager to request, a different storage unit from a virtual data center. The data stored on the particular storage unit may be transferred to the new storage unit.

A determination that the performance of the particular storage unit is incompatible with the particular performance expectations may indicate that the particular storage unit is performing worse than other storage units managed by storage administrator 106. In some embodiments, the determination indicates that the particular storage unit is performing significantly worse than other storage units associated with similar costs. By causing storage administrator 106 to replace the particular underperforming storage unit with a new storage unit, manager 220 may ensure that only well performing storage units are utilized by client 210. Additionally, in certain embodiments, the new storage unit may be associated with a cost similar to the replaced unit. Therefore, by replacing the particular storage unit with a new storage unit, client 210 may receive better performance for the same price.

Figure 4:
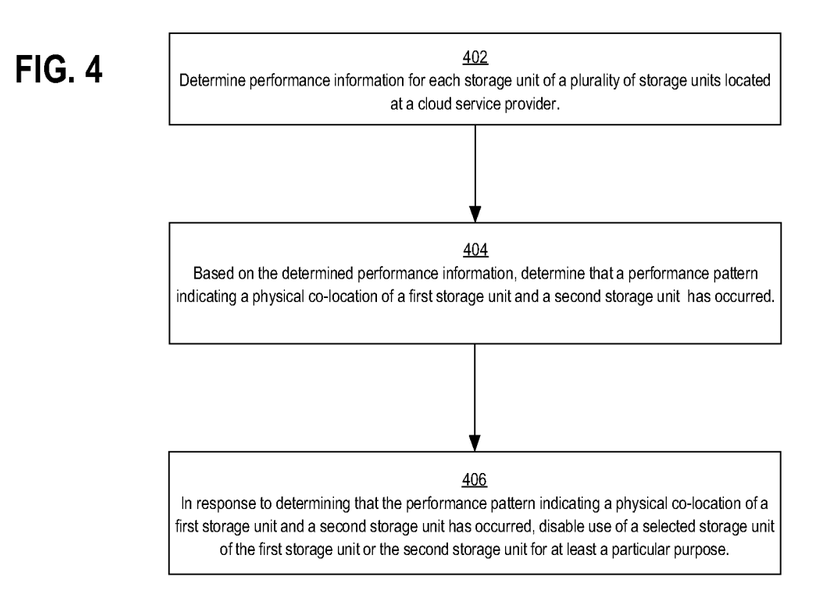
FIG. 4 illustrates an example method for automatically determining that a particular storage unit is not to be used for a particular purpose.

FIG. 4 illustrates an example method for automatically determining that a particular storage unit is not to be used for at least a particular purpose. The method of FIG. 4 may be implemented at storage administrator 106 using one or more computer programs, other software elements, or other functional logic. At block 402, storage administrator 106 determines performance information for each storage unit of a plurality of storage units located at a virtual data center. The determining and other portions of the process of FIG. 4 may be performed by executing storage administrator logic whose execution is controlled by a management entity different than the virtual data center.

The performance information for a particular storage unit may indicate a speed with which the storage unit completes data operation requests The performance information may include more specific information, such as the speed at which read requests are completed, the speed at which write requests are completed, the speed at which read requests are completed, or even more specifically, the speed at which random read operations are completed, or the speed at which random write operations are completed. Performance information about a particular storage unit may be directly observed by storage administrator 106 or storage administrator 106 may determine performance information for storage units by collecting information from the storage unit manager that communicates with the storage unit.

At block 404, storage administrator 106 determines that a performance pattern indicating a physical co-location of a first storage unit and a second storage has occurred. The occurrence of the performance pattern may indicate that the two storage units are hosted by the same physical machine or are likely to exhibit similar performance characteristics for other reasons. In an embodiment, the performance pattern is a pattern of the first storage unit and the second storage unit of the plurality of storage units performing similarly. For example, the performance pattern may require that the two storage units have similar data operation completion rates at around the same time.

In another embodiment, the performance pattern is a pattern of one storage unit having a performance rate that is inversely correlated with the workload capacity of a second storage unit. For example, the performance pattern may require a pattern of a first storage unit providing low data operation completion speeds at the time that a second storage unit experiences high workload, or a pattern of a first storage unit providing high data operation completion speeds at the time that the second storage unit experiences low workload. The performance pattern may also require a pattern of the converse to occur. That is, the performance pattern may require, for example, a pattern of the second storage unit providing high data operation completion speeds at the same time that the first storage unit experiences low workload.

Pattern definitions may define when a performance pattern occurs, and the pattern definitions may vary according to different embodiments. For example, in some embodiments, storage administrator 106 may determine that a pattern has occurred if the first storage unit and the second storage both receive similar data operation requests at around the same time, and complete the requested data operations at a similar speed on at least four different occasions, where the at least four different occasions at least 24 hours apart. In an embodiment, the occurrence of a pattern may also require that the data operation completion rate of the two storage units be faster than two standard deviations above, or slower than two standard deviations below, the median response rate of a set of storage units, at the same time, on at least three different occasions.

At block 406, in response to determining that a performance pattern indicating a physical co-location of a first storage unit and a second storage unit has occurred, storage administrator 106 disables use of a selected storage unit of the first storage unit or the second storage unit for a particular purpose. In some embodiments, disabling use of the selected storage unit comprises disabling use of the selected storage unit for a particular purpose, where both storage units were used for the same particular purpose prior to disabling. Storage administrator 106 may request, or instruct a storage unit manager that manages the selected storage unit to request, a new storage unit from a virtual data center and/or transfer the data from the disabled storage unit to the new storage unit.

For example, prior to the determination, a first storage unit and a second storage unit may both store data associated with a particular client. In response to determining that a pattern of two storage units performing similarly has occurred, storage administrator may disable use of the selected storage unit for storing data associated with the particular client.

As another example, prior to the determination, the first storage unit may store a copy of the data stored in the second storage unit. The data may be stored redundantly for greater reliability and to increase data retrieval speeds. In such an embodiment, in response to determining that a pattern of the first and second storage units performing similarly has occurred, storage administrator 106 may disable use of the selected storage unit for storing a copy of data stored in the other storage unit.

The process of FIG. 4 may be beneficial in systems where a failure in both the first and second storage unit at the same time would be especially detrimental. For example, the failure of both storage units may be particularly harmful if the purpose of the first storage unit is to redundantly store data that is also stored in the second storage unit. A failure in both the storage units may cause the redundantly stored data to be completely inaccessible.

A pattern of the two storage units performing similarly may indicate that the two storage units are hosted by the same physical machine. In a system where two storage units are hosted by the same physical machine, a condition causing failure of one storage unit is very likely to also cause a failure of the other storage unit. Therefore, by disabling the usage of the first storage unit or the second storage unit, in response to determining an occurrence of a pattern of the two storage units performing similarly, manager 220 may, in some embodiments, decrease the chances of both the first and second storage system failing at the same time.

In some embodiments, the second storage unit may not have been used for the particular purpose prior to disabling use of the second storage unit for the particular purpose. For example, storage administrator 106 may perform a performance test with one or more storage units before production, and may detect an occurrence of a pattern of the two storage units performing similarly during the testing phase.

3.0 Implementation Mechanisms—Hardware Overview

Figure 5:
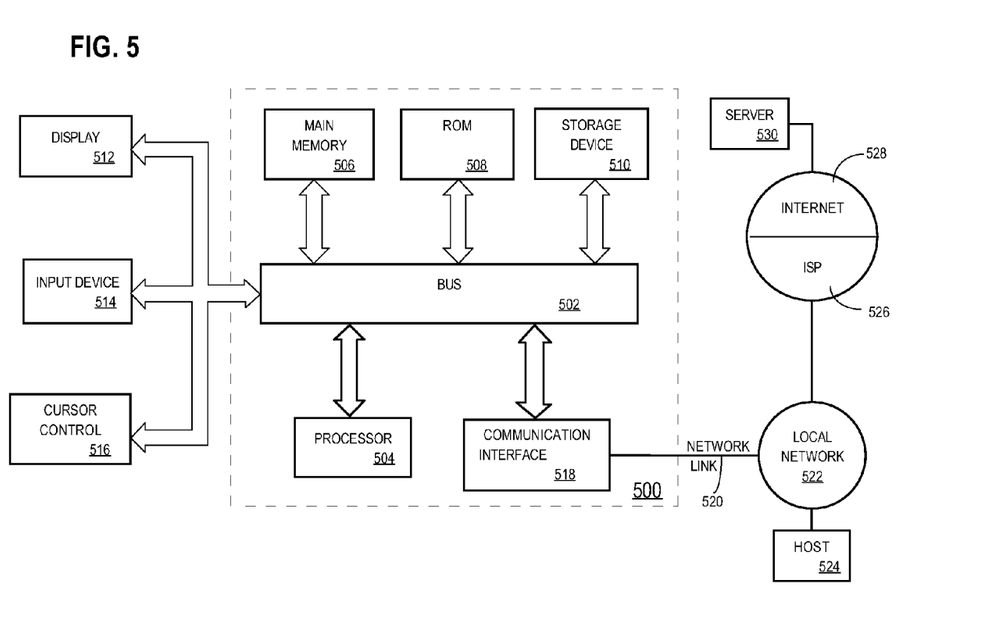
FIG. 5 illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

6.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    determining performance information for each storage unit of a plurality of storage units located at a virtual data center, wherein the determining is performed by executing storage administrator logic whose execution is controlled by a management entity different than a provider of the virtual data center;
    automatically determining, based on the determined performance information, performance expectations that include particular one or more performance expectations applicable to a particular storage unit;
    determining that performance of the particular storage unit is incompatible with the particular one or more performance expectations;
    based on the determined performance information, determining that a performance pattern indicating a physical co-location of a first storage unit and a second storage unit has occurred;
    wherein the performance pattern is based on the first storage unit and the second storage unit performing similarly according to performance characteristics of data operations, at the first storage unit and at the second storage unit, included in the performance information;
    in response to determining that the performance pattern has occurred, disabling use of a selected storage unit of the first storage unit or the second storage unit for at least a particular purpose;
    causing, at least partially in response to determining that performance of the particular storage unit is incompatible with the particular one or more performance expectations, a reduction in utilization of the particular storage unit;
    wherein the method is performed by one or more computing devices.

2. The method of claim 1, wherein the particular one or more performance expectations indicate a particular minimum speed of accessing or saving data and determining that performance of the particular storage unit is incompatible with the particular one or more performance expectations comprises determining that a speed of accessing or saving data to the particular storage unit is frequently slower than the particular minimum speed.

3. The method of claim 1, wherein the particular one or more performance expectations are applicable to a particular class of storage units, wherein the particular class of storage units is defined as storage units that are associated with a usage cost that is within a particular cost range.

4. The method of claim 1, comprising determining the particular one or more performance expectations based on observed performance information received from a plurality of modules within two or more virtual machines, wherein each virtual machine of the two or more virtual machines is capable of communicating directly with at least one storage unit of the plurality of storage units.

5. The method of claim 1, wherein causing a reduction in utilization of the particular storage unit comprises instructing a virtual machine to transfer data stored on the particular storage unit to a different storage unit.

6. The method of claim 1, comprising directing requests to read or write data to one or more different target storage units instead of the particular storage unit.

7. The method of claim 1, wherein at least a one storage unit of the plurality of storage units is at a first virtual data center and at least another storage unit of the plurality of storage units is at a second, different virtual data center.

8. A method comprising:
    determining performance information for each storage unit of a plurality of storage units located at a virtual data center, wherein the determining is performed by executing storage administrator logic whose execution is controlled by a management entity different than a virtual data center provider;
    based on the determined performance information, determining that a performance pattern indicating a physical co-location of a first storage unit and a second storage unit has occurred;
    wherein the performance pattern is based on the first storage unit and the second storage unit performing similarly according to performance characteristics of data operations, at the first storage unit and at the second storage unit, included in the performance information;
    in response to determining that the performance pattern has occurred, disabling use of a selected storage unit of the first storage unit or the second storage unit for at least a particular purpose;
    wherein the method is performed by one or more devices.

9. The method of claim 8, comprising determining that a performance pattern indicating a physical co-location of a first storage unit and a second storage unit has occurred by determining that response rates of the first storage unit and the second storage unit have been sufficiently similar on a plurality of different occasions.

10. The method of claim 8, comprising determining that a performance pattern indicating a physical co-location of a first storage unit and a second storage unit has occurred by determining that a pattern of the first storage unit having a performance rate that is inversely correlated with a workload capacity of the second storage unit has occurred.

11. The method of claim 8, comprising determining the performance information based on observed performance information received from a plurality of virtual machines, wherein each virtual machine of the plurality of virtual machines communicates directly with at least one storage unit of the plurality of storage units.

12. The method of claim 8, comprising performing, at a storage unit management computer, the determining that the performance pattern has occurred and the disabling use of a selected storage unit of the first storage unit or the second storage unit for at least a particular purpose;
   further comprising receiving, at the storage unit management computer, all requests to read information from or write information to the plurality of storage units from a client system before routing the requests to a storage unit of the plurality of storage units.

13. The method of claim 8, wherein the particular purpose is storing data for a particular client.

14. The method of claim 8, wherein the particular purpose is storing a copy of data stored in a non-selected storage unit of the first storage unit and the second storage unit.

15. A non-transitory computer-readable storage medium comprising one or more sequences of instructions which when executed by one or more processors cause the one or more processors to perform:
   determining performance information for each storage unit of a plurality of storage units located at a virtual data center, wherein the determining is performed by executing storage administrator logic whose execution is controlled by a management entity different than the virtual data center provider;
   automatically determining, based on the determined performance information, performance expectations that include particular one or more performance expectations applicable to a particular storage unit;
   determining that performance of the particular storage unit is incompatible with the particular one or more performance expectations;
   based on the determined performance information, determining that a performance pattern indicating a physical co-location of a first storage unit and a second storage unit has occurred;
   wherein the performance pattern is based on the first storage unit and the second storage unit performing similarly according to performance characteristics of data operations, at the first storage unit and at the second storage unit, included in the performance information;
   in response to determining that the performance pattern has occurred, disabling use of a selected storage unit of the first storage unit or the second storage unit for at least a particular purpose; and
   causing, at least partially in response to determining that performance of the particular storage unit is incompatible with the particular one or more performance expectations, a reduction in utilization of the particular storage unit.

16. The non-transitory computer-readable storage medium of claim 15, wherein the particular one or more performance expectations indicate a particular minimum speed of accessing or saving data and determining that performance of the particular storage unit is incompatible with the particular one or more performance expectations comprises determining that a speed of accessing or saving data to the particular storage unit is frequently slower than the particular minimum speed.

17. The non-transitory computer-readable storage medium of claim 15, wherein the particular one or more performance expectations are applicable to a particular class of storage units, wherein the particular class of storage units is defined as storage units that are associated with a usage cost that is within a particular cost range.

18. The non-transitory computer-readable storage medium of claim 15, wherein the sequences of instructions which when executed by the one or more processors cause the one or more processors to perform:
   determining the particular one or more performance expectations based on observed performance information received from a plurality of modules within two or more virtual machines, wherein each virtual machine of the two or more virtual machines is capable of communicating directly with at least one storage unit of the plurality of storage units.

19. The non-transitory computer-readable storage medium of claim 15, wherein causing a reduction in utilization of the particular storage unit comprises instructing a virtual machine to transfer data stored on the particular storage unit to a different storage unit.

20. The non-transitory computer-readable storage medium of claim 15, wherein the sequences of instructions which when executed by the one or more processors cause the one or more processors to perform:
   directing requests to read or write data to one or more different target storage units instead of the particular storage unit.

21. The non-transitory computer-readable storage medium of claim 15, wherein at least one storage unit of the plurality of storage units is at a first virtual data center and at least another storage unit of the plurality of storage units is at a second, different, virtual data center.

22. A non-transitory computer-readable storage medium comprising one or more sequences of instructions which when executed by one or more processors cause the one or more processors to perform:
   determining performance information for each storage unit of a plurality of storage units located at a virtual data center, wherein the determining is performed by executing storage administrator logic whose execution is controlled by a management entity different than a virtual data center provider;
   based on the determined performance information, determining that a performance pattern indicating a physical co-location of a first storage unit and a second storage unit has occurred;
   wherein the performance pattern is based on the first storage unit and the second storage unit performing similarly according to performance characteristics of data operations, at the first storage unit and at the second storage unit, included in the performance information;

in response to determining that the performance pattern has occurred, disabling use of a selected storage unit of the first storage unit or the second storage unit for at least a particular purpose.

23. The non-transitory computer-readable storage medium of claim 22, wherein the sequences of instructions which when executed by the one or more processors cause the one or more processors to perform:
   determining that a performance pattern indicating a physical co-location of a first storage unit and a second storage unit has occurred by determining that response rates of the first storage unit and the second storage unit have been sufficiently similar on a plurality of different occasions.

24. The non-transitory computer-readable storage medium of claim 22, wherein the sequences of instructions which when executed by the one or more processors cause the one or more processors to perform:
   determining that a performance pattern indicating a physical co-location of a first storage unit and a second storage unit has occurred by determining that a pattern of the first storage unit having a performance rate that is inversely correlated with a workload capacity of the second storage unit has occurred.

25. The non-transitory computer-readable storage medium of claim 22, wherein the sequences of instructions which when executed by the one or more processors cause the one or more processors to perform:
   determining the performance information based on observed performance information received from a plurality of virtual machines, wherein each virtual machine of the plurality of virtual machines communicates directly with at least one storage unit of the plurality of storage units.

26. The non-transitory computer-readable storage medium of claim 22, wherein the sequences of instructions which when executed by the one or more processors cause the one or more processors to perform:
   performing, at a storage unit management computer, the determining that the performance pattern has occurred and the disabling use of a selected storage unit of the first storage unit or the second storage unit for at least a particular purpose;
   receiving, at the storage unit management computer, all requests to read information from or write information to the plurality of storage units from a client system before routing the requests to a storage unit of the plurality of storage units.

27. The non-transitory computer-readable storage medium of claim 22, wherein the particular purpose is storing data for a particular client.

* * * * *